United States Patent [19]

Maskasky

[11] 4,225,658
[45] Sep. 30, 1980

[54] ULTRASONIC IMAGING WITH CATALYTIC ELEMENTS

[75] Inventor: Joe E. Maskasky, Rochester, N.Y.

[73] Assignee: Eastman Kodak Company, Rochester, N.Y.

[21] Appl. No.: 8,910

[22] Filed: Feb. 2, 1979

[51] Int. Cl.² ............................................. G03C 5/04
[52] U.S. Cl. ...................................... 430/3; 430/363; 430/374; 430/376; 430/413; 430/449; 430/936; 430/943; 430/961
[58] Field of Search ............... 96/27, 48, D, 114.1, 96/22; 430/3

[56] References Cited

U.S. PATENT DOCUMENTS

| | | | |
|---|---|---|---|
| 3,320,064 | 5/1967 | Hanson et al. | 430/153 |
| 4,089,685 | 5/1978 | Bissonette | 96/22 |

FOREIGN PATENT DOCUMENTS 2381343  2/1978  France .......................................... 96/27

OTHER PUBLICATIONS

Berger et al, J. Acoust. Soc. Am., vol. 34, pp. 518–519, (1962).

Primary Examiner—Travis Brown
Attorney, Agent, or Firm—Carl O. Thomas

[57] ABSTRACT

A process is disclosed for producing an ultrasonographic image using an element containing a catalyst and a diffusion barrier. When the element is placed into contact with a solution containing a catalyst poison and ultrasound is imagewise applied, the catalyst is selectively poisoned in ultrasonically exposed areas. Thereafter the unpoisoned catalyst remaining is employed to form a viewable image. The catalyst can be electrically biased to avoid poisoning during extended contact with the catalyst poisoning solution in the absence of ultrasound. In one form the catalyst can be generated using a photographic silver halide emulsion.

15 Claims, 1 Drawing Figure

ULTRASONIC IMAGING WITH CATALYTIC ELEMENTS

FIELD OF THE INVENTION

This invention is directed to a process of recording a pattern of ultrasonic exposure. More specifically, this invention is directed to forming a visible image through imagewise ultrasonic alteration of an element and conversion of the imagewise ultrasonically induced alteration of the element to a viewable ultrasonographic image. In an additional aspect, this invention is directed to protecting the element against alteration prior to ultrasonic exposure.

BACKGROUND OF THE INVENTION

Rosenfeld U.S. Ser. No. 854,556, filed Nov. 25, 1977, titled AN IMPROVEMENT IN ULTRASONOGRAPHY, now abandoned in favor of continuation-in-part patent application Ser. No. 31,083, filed Apr. 18, 1979 is directed to an improved process of ultrasonic imaging in which a visible ultrasonic image is formed in a silver halide element by imagewise exposing the element to ultrasonic radiation, thereby altering its photographic response, and concurrently or subsequently exposing the silver halide element to electromagnetic radiation to form a developable latent image. The element is then photographically processed to produce a visible image corresponding to the latent image.

Rosenfeld U.S. Ser. No. 3,571, filed Jan. 15, 1979, titled ULTRASOUND IMAGING OF INTERNALLY FOGGED SILVER HALIDE ELEMENTS, is directed to a process of forming in a silver halide photographic element a visible image corresponding to a pattern of ultrasonic exposure. This process is characterized by providing in the photographic element internally fogged silver halide grains and associating the element with a transparent liquid in the presence of a solute, such as a silver halide solvent or iodide ions, capable of rendering the internally fogged silver halide grains developable in a surface developer in the absence of ultrasound exposure after an elapsed period. The element is image-wise ultrasonically exposed before the period has elapsed and then developed in a surface developer to produce a visible image defined by the pattern of ultrasound exposure. The ultrasound functions to accelerate the action of the solute in rendering the internal fog accessible to the surface developer.

In each of the Rosenfeld disclosures it is specifically taught to form dye images by a conventional dye image amplification reaction of an oxidizing agent and a dye-imagegenerating reducing agent using a silver image as a catalyst.

Bissonette U.S. Pat. No. 4,089,685, issued May 16, 1978, and the art discussed therein illustrate the knowledge of the art with respect to poisoning catalysts for redox reactions of oxidizing agents and dye-image-generating reducing agents. Bissonette specifically discloses the use of iodide ions and silver halide stabilizers as catalyst poisoning agents. Hanson et al U.S. Pat. No. 3,320,064, issued May 15, 1967, discloses poisoning of catalytic nuclei for physical development.

SUMMARY OF THE INVENTION

In one aspect the present invention is directed to a process of producing an ultrasonographic image. In the process, a transport liquid containing a catalyst poison is brought into contact with an imaging element. The element comprises a support bearing an imaging catalyst and barrier means to impede diffusion of the catalyst poison. The barrier means is interposed between the catalyst and the transport liquid which contains the poison. The element is exposed to ultrasound in an image pattern to accelerate diffusion of the catalyst poison through the barrier means in exposed areas of the element. An image-forming reaction is catalyzed by the imaging catalyst which remains unpoisoned, so that an image pattern is produced which corresponds to the pattern of ultrasonic exposure.

In another aspect the present invention is directed to a process of producing an ultrasonographic image. In this process a solution containing a transport liquid and a catalyst poison is brought into contact with an element comprising a conductive portion presenting a catalyst surface and a barrier layer overlying the catalyst surface for impeding diffusion of the catalyst poison. The conductive portion is electrically biased to a positive potential in excess of the oxidation potential of the catalyst to inhibit poisoning of the catalyst surface. The electrical bias is removed, and the element is exposed to ultrasound in an image pattern to accelerate diffusion of the catalyst poison through the barrier layer to the catalyst surface in ultrasound exposed areas. An image-forming reaction is catalyzed at the catalyst surface in areas which remain unpoisoned, so that an image pattern is produced which corresponds to the pattern of ultrasonic exposure.

The processes of this invention although distinct from those of Rosenfeld, identified above, are similar to those of Rosenfeld in permitting ultrasonographic imaging employing relatively low ultrasonic exposure energy levels. The present processes offer advantages with respect to those of Rosenfeld in permitting a broader choice of elements than those containing photographic silver halide emulsions. Further, the process of the present invention can be practiced entirely independently of electromagnetic radiation exposure. For instance, element preparation and processing can be conducted entirely under ordinary room lighting conditions in certain preferred processes of the invention.

In certain forms the processes of this invention offer in addition to the advantages identified above the further advantage of producing viewable images of ultrasonic exposure patterns which can be made independently of the periods the imaging elements remain in contact with the transport liquid containing the catalyst poison before and/or after the imaging diffusion portion of the process occurs. This allows improvement in the consistency of results and offers a time latitude to the operator which can be highly convenient and of substantial importance—e.g., in exposures involving animate subjects.

DESCRIPTION OF PREFERRED EMBODIMENTS

Figure 1:
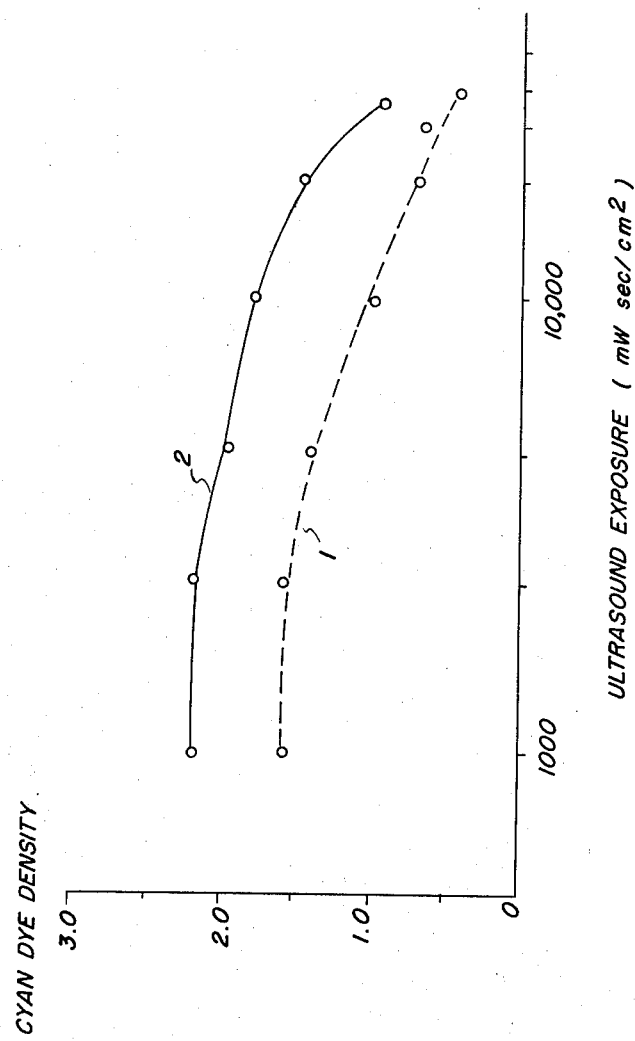

The elements employed in imaging by the practice of this process are initially catalytic and are selectively poisoned as a result of ultrasound exposure to reduce their catalytic activity in an image pattern corresponding to the image pattern of ultrasound exposure. The elements are comprised of a catalytic portion and a barrier material to impede poisoning of the catalyst in the absence of ultrasound. In one form the conductive portion can take the form of a support providing a catalytic surface which is overcoated with a layer of barrier material. In an alternative form a catalytic material in a particulate form can be blended with a barrier material and coated on a support.

In one specifically preferred form the element is provided with an electrically conductive portion providing a catalyst surface. For example, the element can be comprised of an electrically conductive catalyst coating on an electrically insulative support. Alternatively, the support can also be electrically conductive. The catalyst layer can be deposited on the support using any convenient conventional technique. Since many of the preferred catalysts are precious metals, it is usually preferred to employ coating techniques which permit thin layers of the catalyst to be deposited, such as vacuum vapor deposition, electroless plating and electroplating. Where a very thin catalyst layer is employed to provide a catalytic surface on an insulative support, an electrically conductive material, such as a metal layer, can be coated on the support to underlie the catalyst layer.

In an alternative form of this process the elements need not be electrically conductive, and the catalyst can be employed in a particulate form blended with the barrier material. The catalyst material is preferably employed in a finely divided form to increase its surface area per unit weight. For example, the catalyst can be finely divided in the form of a powder or even in colloidal form. When the catalyst is blended with the barrier material and coated on a support, a portion of catalyst will lie at or slightly beneath the coating surface and thereby be more susceptible to poisoning. Although not required, it is specifically contemplated that barrier material can be coated over the blended barrier material-catalyst coating.

Silver constitutes one preferred catalyst material. Silver can be vacuum vapor deposited or plated as described above to form a continuous conductive catalyst surface. Alternatively, silver can be employed in a finely particulate form. For example, a silver halide photographic element comprised of a support and at least one silver halide emulsion layer can be processed by conventional photographic techniques to form silver on the surfaces of the silver halide grains in the emulsion. That is, the silver halide grains can be surface fogged, as by light exposure and/or chemical fogging treatments. Alternatively, the silver halide grains can be entirely converted to silver specks. This can be accomplished by conventional photographic techniques, such as by bringing the element containing the silver halide emulsion into contact with a photographic developer for a sufficient period to reduce the silver halide grains completely to silver. In an alternative form in which the silver is blended with the barrier material the silver can be in colloidal form. For instance, the catalyst containing layer can be a conventional Carey Lea silver layer commonly used as a yellow filter layer in photographic elements. Unlike photographic applications, however, it is not necessary to control the colloid particle size to obtain any particular hue in the catalyst containing layer.

While silver constitutes one preferred catalyst material, it is recognized that other catalysts known to be subject to poisoning can also be employed. For example, Group IB and VIII metals are specifically contemplated for use as catalysts as well as sulfides and selenides of these metals. Such catalysts are disclosed, for instance, by Hanson et al U.S. Pat. No. 3,320,064. Palladium is a catalyst of particularly high activity, and is a preferred catalyst.

The barrier material is chosen so that when the catalytic element is placed into contact with a transport liquid containing a catalyst poison, diffusion of the catalyst poison through the barrier material to the catalyst is impeded in the absence of ultrasound. Generally any material useful as a vehicle or binder in a photographic element layer which is penetrable by a processing liquid, such as a developer, is useful in the practice of this process. It is generally preferred to employ hydrophilic colloids alone or in combination with other materials as barrier materials. Suitable hydrophilic materials include both naturally occurring substances such as proteins, protein derivatives, cellulose derivatives—e.g., cellulose esters, gelatin—e.g., alkali-treated gelatin (cattle bone or hide gelatin) or acid-treated gelatin (pigskin gelatin), gelatin derivatives—e.g., acetylated gelatin, phthalated gelatin and the like, polysaccharides such as dextran, gum arabic, zein, casein, pectin, collagen derivatives, collodion, agar-agar, arrowroot, albumin and the like as described in Yutzy et al U.S. Pat. Nos. 2,614,928 and '929, Lowe et al U.S. Pat. Nos. 2,691,582, 2,614,930, '931, 2,327,808 and 2,448,534, Gates et al U.S. Pat. Nos. 2,787,545 and 2,956,880, Himmelmann et al U.S. Pat. No. 3,061,436, Farrell et al U.S. Pat. No. 2,816,027, Ryan U.S. Pat. Nos. 3,132,945, 3,138,461 and 3,186,846, Dersch et al U.K. Pat. No. 1,167,159 and U.S. Pat. Nos. 2,960,405 and 3,436,220, Geary U.S. Pat. No. 3,486,896, Gazzard U.K. Pat. No. 793,549, Gates et al U.S. Pat. Nos. 2,992,213, 3,157,506, 3,184,312 and 3,539,353, Miller et al U.S. Pat. No. 3,227,571, Boyer et al U.S. Pat. No. 3,532,502, Malan U.S. Pat. No. 3,551,151, Lohmer et al U.S. Pat. No. 4,018,609, Luciani et al U.K. Pat. No. 1,186,790, U.K. Pat. No. 1,489,080 and Hori et al Belgian Pat. No. 856,631, U.K. Pat. No. 1490,644, U.K. Pat. No. 1,483,551, Arase et al U.K. Pat. No. 1,459,906, Salo U.S. Pat. Nos. 2,110,491 and 2,311,086, Fallesen U.S. Pat. No. 2,343,650, Yutzy U.S. Pat. No. 2,322,085, Lowe U.S. Pat. No. 2,563,791, Talbot et al U.S. Pat. No. 2,725,293, Hilborn U.S. Pat. No. 2,748,022, DePauw et al U.S. Pat. No. 2,956,883, Ritchie U.K. Pat. No. 2,095, DeStubner U.S. Pat. No. 1,752,069, Sheppard et al U.S. Pat. No. 2,127,573, Lierg U.S. Pat. No. 2,256,720, Gaspar U.S. Pat. No. 2,361,936, Farmer U.K. Pat. No. 15,727, Stevens U.K. Pat. No. 1,062,116 and Yamamoto et al U.S. Pat. No. 3,923,517.

The barrier layers can also contain alone or in combination with hydrophilic water permeable colloids as vehicles or vehicle extenders (e.g., in the form of latices), synthetic polymeric peptizers, carriers and/or binders such as poly(vinyl lactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkylsulfonic acid copolymers, sulfoalkylacrylamide copolymers, polyalkyleneimine copolymers, polyamines, N,N,-dialkylaminoalkyl acrylates, vinyl imidazole copolymers, vinyl sulfide copolymers, halogenated styrene polymers, amineacrylamide polymers, polypeptides and the like as described in Hollister et al U.S. Pat. Nos. 3,679,425, 3,706,564 and 3,813,251, Lowe U.S. Pat. Nos. 2,253,078, 2,276,322, '323, 2,281,703, 2,311,058 and 2,414,207, Lowe et al U.S. Pat. Nos. 2,484,456, 2,541,474 and 2,632,704, Perry et al U.S. Pat. Nos. 3,425,836, Smith et al U.S. Pat. Nos. 3,415,653 and 3,615,624, Smith U.S. Pat. No. 3,488,708, Whiteley et al U.S. Pat. Nos. 3,392,025 and 3,511,818, Fitzgerald U.S. Pat. Nos. 3,681,079, 3,721,565, 3,852,073, 3,861,918 and 3,925,083, Fitzgerald et al U.S. Pat. No. 3,879,205, Nottorf U.S. Pat. No. 3,142,568, Houck et al U.S. Pat. Nos. 3,062,674 and 3,220,844, Dann et al U.S. Pat. No. 2,882,161, Schupp U.S. Pat. No. 2,579,016, Weaver U.S. Pat. No. 2,829,053, Alles et al U.S. Pat. No. 2,698,240, Priest et al U.S. Pat. No. 3,003,879, Merrill et al U.S. Pat. No. 3,419,397, Stonham U.S. Pat. No. 3,284,207, Lohmer et al U.S. Pat. No. 3,167,430, Williams U.S. Pat. No. 2,957,767, Dawson et al U.S. Pat. No. 2,893,867, Smith et al U.S. Pat. Nos. 2,860,986 and 2,904,539, Ponticello et al U.S. Pat. Nos. 3,929,482 and 3,860,428, Ponticello U.S. Pat. No. 3,939,130, Dykstra U.S. Pat. No. 3,411,911 and Dykstra et al Canadian Pat. No. 774,054, Ream et al U.S. Pat. No. 3,287,289, Smith U.K. Pat. No. 1,466,600, Stevens U.K. Pat. No. 1,062,116, Fordyce U.S. Pat. No. 2,211,323, Martinez U.S. Pat. 2,284,877, Watkins U.S. Pat. No. 2,420,455, Jones U.S. Pat. No. 2,533,166, Bolton U.S. Pat. No. 2,495,918, Graves U.S. Pat. No. 2,289,775, Yackel U.S. Pat. No. 2,565,418, Unruh et al U.S. Pat. Nos. 2,865,893 and 2,875,059, Rees et al U.S. Pat. No. 3,536,491, Broadhead et al U.K. Pat. No. 1,348,815, Taylor et al U.S. Pat. No. 3,479,186, Merrill et al U.S. Pat. No. 3,520,857, Bacon et al U.S. Pat. No. 3,690,888, Bowman U.S. Pat. No. 3,748,143, Dickinson et al U.K. Pat. Nos. 808,227 and '228, Wood U.K. Pat. No. 822,192 and Iguchi et al U.K. Pat. No. 1,398,055.

As is well understood in the photographic arts the vehicles, particularly gelatin and gelatin-derived vehicle materials, are hardened to avoid undue ingestion of liquids and/or softening during processing of the element. Illustrative conventional hardeners are disclosed in Paragraph VII, Hardeners, *Product Licensing Index,* Vol. 92, December 1971, publication 9232, p. 108. Both *Product Licensing Index and Research Disclosure,* cited below, are published by Industrial Opportunities Ltd., Homewell, Havant Hampshire, PO9, 1ER, UK.

The catalytic elements can be either rigid or flexible. The catalyst can itself impart the requisite dimensional integrity to the element when present in a continuous form, such as a metal foil or plate. In the preferred form the catalyst and barrier materials are both coated on a common support. It is specifically contemplated to employ supports of the type conventionally employed in forming photographic elements. Typical photographic supports include polymeric film, wood fiber—e.g., paper, metallic sheet and foil, glass and ceramic supporting elements provided with one or more subbing layers to enhance the adhesive, antistatic, dimensional, abrasive, hardness, frictional and/or other properties of the support surface.

Typical of useful polymer film supports are films of cellulose nitrate and cellulose esters such as cellulose triacetate and diacetate, polystyrene, polyamides, homo- and co-polymers of vinyl chloride, poly(vinyl acetal), polycarbonate, homo- and co-polymers of olefins, such as polyethylene and polypropylene, and polyesters of dibasic aromatic carboxylic acids with divalent alcohols, such as poly(ethylene terephthalate).

Typical of useful paper supports are those which are partially acetylated or coated with baryta and/or a polyolefin, particularly a polymer of an α-olefin containing 2 to 10 carbon atoms, such as polyethylene, polypropylene, copolymers of ethylene and propylene and the like.

Polyolefins, such as polyethylene, polypropylene and polyallomers—e.g., copolymers of ethylene with propylene, as illustrated by Hagemeyer et al U.S. Pat. No. 3,478,128, are preferably employed as resin coatings over paper, as illustrated by Crawford et al U.S. Pat. No. 3,411,908 and Joseph et al U.S. Pat. No. 3,630,740, over polystyrene and polyester film supports, as illustrated by Crawford et al U.S. Pat. No. 3,630,742, or can be employed as unitary flexible reflection supports, as illustrated by Venor et al U.S. Pat. No. 3,973,963.

Preferred cellulose ester supports are cellulose triacetate supports, as illustrated by Fordyce et al U.S. Pat. Nos. 2,492,977, '978 and 2,739,069, as well as mixed cellulose ester supports, such as cellulose acetate propionate and cellulose acetate butyrate, as illustrated by Fordyce et al U.S. Pat. No. 2,739,070.

Preferred polyester film supports are comprised of linear polyester, such as illustrated by Alles et al U.S. Pat. No. 2,627,088, Wellman U.S. Pat. No. 2,720,503, Alles U.S. Pat. No. 2,779,684 and Kibler et al U.S. Pat. No. 2,901,466. Polyester films can be formed by varied techniques, as illustrated by Alles, cited above, Czerkas et al U.S. Pat. No. 3,663,683 and Williams et al U.S. Pat. No. 3,504,075, and modified for use as photographic film supports, as illustrated by Van Stappen U.S. Pat. No. 3,227,576, Nadeau et al U.S. Pat. No. 3,501,301, Reedy et al U.S. Pat. No. 3,589,905, Babbitt et al U.S. Pat. No. 3,850,640, Bailey et al U.S. Pat. No. 3,888,678, Hunter U.S. Pat. No. 3,904,420 and Mallinson et al U.S. Pat. No. 3,928,697.

The catalytic elements can employ supports which are resistant to dimensional change at elevated temperatures. Such supports can be comprised of linear condensation polymers which have glass transition temperatures above about 190° C., preferably 220° C., such as polycarbonates, polycarboxylic esters, polyamides, polysulfonamides, polyethers, polyimides, polysulfonates and copolymer variants, as illustrated by Hamb U.S. Pat. Nos. 3,634,089 and 3,772,405; Hamb et al U.S. Pat. Nos. 3,725,070 and 3,793,249; Wilson *Research Disclosure,* Vol. 118, February 1974, Item 11833, and Vol. 120, April 1974, Item 12046; Conkin et al *Research Disclosure,* Vol. 120, April 1974, Item 12012; Product Licensing Index, Vol. 92, December 1971, Items 9205 and 9207; *Research Disclosure,* Vol. 101, September 1972, Items 10119 and 10148; *Research Disclosure,* Vol. 106, February 1973, Item 10613; *Research Disclosure,* Vol. 117, January 1974, Item 11709, and *Research Disclosure,* Vol. 134, June 1975, Item 13455.

In those instances where it is intended to form dye images, dye-image-generating materials identical to those incorporated in color photographic elements can be included in the catalytic elements. The dye-image-generating materials can be incorporated in the catalyst-containing layers of the elements or in an adjacent layer nearer or further from the support than the catalyst-containing layer.

The catalytic elements can produce dye images through the selective formation of dyes, such as by reacting (coupling) a color-developing agent (e.g., a primary aromatic amine) in its oxidized form with a dye-forming coupler. The dye-forming couplers can be incorporated in the photographic elements, as illustrated by Schneider et al, *Die Chemie,* Vol. 57, 1944, p. 113, Mannes et al U.S. Pat. No. 2,304,940, Martinez U.S.

Pat. No. 2,269,158, Jelley et al U.S. Pat. No. 2,322,027, Frolich et al U.S. Pat. No. 2,376,679, Fierke et al U.S. Pat. No. 2,801,171, Smith U.S. Pat. No. 3,748,141, Tong U.S. Pat. No. 2,772,163, Thirtle et al U.S. Pat. No. 2,835,579, Sawdey et al U.S. Pat. No. 2,533,514, Peterson U.S. Pat. No. 2,353,754, Seidel U.S. Pat. No. 3,409,435 and Chen *Research Disclosure*, Vol. 159, July 1977, Item 15930.

In one form the dye-forming couplers are chosen to form subtractive primary (i.e., yellow, magenta and cyan) image dyes and are nondiffusible, colorless couplers, couplers of the open chain ketomethylene, pyrazolone, pyrazolotriazole, pyrazolobenzimidazole, phenol and naphthol type hydrophobically ballasted for incorporation in high-boiling organic (coupler) solvents. Such couplers are illustrated by Salminen et al U.S. Pat. Nos. 3,423,730, 2,772,162, 2,895,826, 2,710,803, 2,407,207, 3,737,316 and 2,367,531, Loria et al U.S. Pat. Nos. 2,772,161, 2,600,788, 3,006,759, 3,214,437 and 3,253,924, McCrossen et al U.S. Pat. No. 2,875,057, Bush et al U.S. Pat. No. 2,908,573, Gledhill et al U.S. Pat. No. 3,034,892, Weissberger et al U.S. Pat. Nos. 2,474,293, 2,407,210, 3,062,653, 3,265,506 and 3,384,657, Porter et al U.S. Pat. No. 2,343,703, Greenhalgh et al U.S. Pat. No. 3,127,269, Feniak et al U.S. Pat. Nos. 2,865,748, 2,933,391 and 2,865,751, Bailey et al U.S. Pat. No. 3,725,067, Beavers et al U.S. Pat. No. 3,758,308, Lau U.S. Pat. No. 3,779,763, Fernandez U.S. Pat. No. 3,785,829, U.K. Pat. No. 969,921, U.K. Pat. No. 1,241,069, U.K. Pat. No. 1,011,940, Vanden Eynde et al U.S. Pat. No. 3,762,921, Beavers U.S. Pat. No. 2,983,608, Loria U.S. Pat. Nos. 3,311,476, 3,408,194, 3,458,315, 3,447,928, 3,476,563, Cressman et al U.S. Pat. No. 3,419,390, Young U.S. Pat. No. 3,419,391, Lestina U.S. Pat. No. 3,519,429, U.K. Pat. No. 975,928, U.K. Pat. No. 1,111,554, Jaeken U.S. Pat. No. 3,222,176 and Canadian Pat. No. 726,651, Schulte et al U.K. Pat. No. 1,248,924 and Whitmore et al U.S. Pat. No. 3,227,550.

The catalytic elements can incorporate alkali-soluble ballasted couplers, as illustrated by Froelich et al and Tong, cited above. The photographic elements can be adapted to form non-diffusible image dyes using dye-forming couplers in developers, as illustrated by U.K. Pat. No. 478,984, Yager et al U.S. Pat. No. 3,113,864, Vittum et al U.S. Pat. Nos. 3,002,836, 2,271,238 and 2,362,598, Schwan et al U.S. Pat. No. 2,950,970, Carroll et al U.S. Pat. No. 2,593,243, Porter et al U.S. Pat. Nos. 2,343,703, 2,376,380 and 2,369,489, Spath U.K. Pat. No. 886,723 and U.S. Pat. No. 2,899,306, Tuite U.S. Pat. No. 3,152,896 and Mannes et al U.S. Pat. Nos. 2,115,394, 2,252,718 and 2,108,602.

Where an initially immobile dye-image-generating reducing agent is employed in dye imaging, it is initially present within the photographic element. Redox dye-releasers (RDR's) constitute a preferred class of initially immobile dye-image-generating reducing agents. Suitable redox dye-releaser containing catalytic elements useful in the practice of my process can be formed by substituting RDR's for the incorporated color couplers in the catalytic elements described above.

Exemplary redox dye-releasers useful in the practice of my process and their synthesis and incorporation into photographic elements are disclosed, for example, in Whitmore et al Canadian Pat. No. 602,607, Fleckenstein Belgian Pat. No. 788,268, Fleckenstein et al U.S. Pat. No. 4,076,529, Gompf U.S. Pat. No. 3,698,897, Becker et al U.S. Pat. No. 3,728,113, Anderson et al U.S. Pat. No. 3,725,062 and U.S. Pat. Nos. 3,443,939, '940, '941, and 3,390,380, all of which are here incorporated by reference. Hinshaw et al U.S. Ser. No. 775,219, filed Mar. 7, 1977, and Chasman et al U.S. Ser. No. 775,025, filed Mar. 7, 1977, also disclose initially immobile dye-image-generating reducing agents and systems for their use which can be employed in the practice of this invention.

Prior to ultrasonic exposure the catalytic elements are placed in contact with a transport liquid containing a catalyst poison. The transport liquid serves two distinct functions. First the transport liquid acts as a medium for the transmission of ultrasound. It is generally recognized that liquids transmit ultrasonic energy more efficiently (that is, with less attenuation) than gaseous media. Second, the transport liquid serves as a reservoir for the catalyst poison which is selectively diffused into the catalytic element during ultrasound exposure.

The transport liquid is related to the catalytic element so that a diffusion path for the catalyst poison is available from the transport liquid through the barrier material to the catalyst contained in the catalytic element. Generally any convenient method of contacting the transport liquid with the barrier material will provide this relationship. In a simple form the transport liquid can be spread on the barrier material by coating or laminating, or the catalytic element can be immersed in the transport liquid.

The specific choice of a transport liquid to be placed in contact with the catalytic element will be influenced, of course, by the specific catalyst poison chosen. Where the catalyst poison is being transported in ionized form, it is preferred that the transport liquid be a polar solvent. Water is a preferred polar solvent for use in the practice of this process; however, any polar solvent or combination of polar solvents known to be compatible with the elements and catalyst poison can be employed. Exemplary useful polar solvents in addition to water include water-miscible alcohols, ketones and amides (e.g., acetone, phenol, ethyl alcohol, methyl alcohol, isopropyl alcohol, ethylene glycol, N,N-dimethylacetamide, and methyl ethyl ketone), tetrahydrofuran, N-methyl-2-pyrrolidone, dimethylsulfoxide and mixtures of the above, with or without water. Generally any transport liquid can be employed which is chemically compatible with the catalyst poison and the catalytic element.

The catalyst poisons employed in the practice of this process are capable of being dispersed, preferably dissolved, in the transport liquid and are diffusible in the barrier material when the barrier material and transport liquid are placed in contact. A variety of catalyst poisons satisfying these criteria are known. Halide ions, particularly bromide and iodide ions, constitute one preferred class of catalyst poisons. Iodide ions are the preferred halide ions for use in catalyst poisoning, since they are more tightly adsorbed by the catalysts and are effective in much lower concentrations. For example, iodide ions, once adsorbed to the surface of the catalyst, cannot be readily displaced even by washing the catalyst in distilled water. The halide ions can be incorporated in the transport liquid in the form of soluble salts, such as ammonium salts, alkali metal salts, etc. Generally satisfactory poisoning can be achieved using bromide ion concentrations in the range of from 1 to 30, preferably 1 to 15, grams per liter of transport liquid. Generally effective iodide ion concentrations are from 1 microgram per liter to 1 gram per liter, preferably 1 milligram per liter of transport liquid.

Mercaptans are also quite useful in poisoning the catalyst. Because of their affinity for the catalysts mercaptans can be used in concentrations which, on a molar basis, correspond to those disclosed for iodide ions, that is, about $1 \times 10^{-5}$ to 10 millimoles per liter of transport liquid. Generally any mercaptan known to be useful in silver halide photographic elements or processing solutions can be employed. Exemplary of useful mercaptans are the following:

Mercaptoalkylamidobenzothiazoles: U.S. Pat. No. 2,503,861, issued Apr. 11, 1950;

Mercaptoalkylamidothiazoles: U.S. Pat. Nos. 2,657,136, issued Oct. 27, 1953, and 2,697,099, issued Dec. 14, 1954;

Mercaptoazines and azoles, etc.: U.S. Pat. No. 2,753,027, issued Oct. 30, 1951;

Mercaptoazoles: U.S. Pat. Nos. 2,131,038, issued Sept. 27, 1938, 2,353,754, issued July 18, 1944, 2,432,865, issued Dec. 16, 1947, 2,453,346, issued Nov. 9, 1948, 2,566,659, issued Sept. 4, 1951, 2,668,113, issued Feb. 2, 1954 and 2,590,775, issued Mar. 14, 1952;

Mercaptocysteines: U.S. Pat. No. 2,363,777, issued Nov. 28, 1944;

Mercaptoglutathiones: U.S. Pat. No. 2,110,178, issued Mar. 8, 1938;

Mercaptooxidiazoles: U.S. Pat. No. 2,843,491, issued July 15, 1958;

Mercaptopyrimidines, etc.: U.S. Pat. Nos. 2,173,628, issued Sept. 19, 1939, 2,231,127, issued Feb. 11, 1948, 2,232,707, issued Feb. 25, 1941 and 2,304,962, issued Dec. 15, 1942;

Mercaptotetrazoles: U.S. Pat. Nos. 2,403,927, issued July 16, 1946, 2,453,087, issued Nov. 2, 1948, 2,465,149, issued Mar. 22, 1949 and 2,697,040, issued Dec. 14, 1954;

Mercaptothiadiazoles: U.S. Pat. No. 2,743,184, issued Apr. 24, 1956;

Mercaptothiazoles: U.S. Pat. Nos. 2,759,821, issued Aug. 21, 1956 and 2,824,001, issued Feb. 18, 1958;

Mercaptothiophenes: U.S. Pat. Nos. 1,758,567, issued May 13, 1930 and 2,214,446, issued Sept. 10, 1940;

Mercaptotriazines: U.S. Pat. No. 2,476,536, issued July 19, 1949; Mercaptotriazoles, etc.: Australian Pat. No. 125,480, issued Nov. 26, 1943 and Miscellaneous mercaptans: U.S. Pat. No. 3,017,270, issued Jan. 16, 1962. Instead of employing mercaptans directly it is possible to use compounds which are precursors of mercaptans and which convert to mercaptans in the transport liquid. For example, disulfides, such as 6,8-dithiooctanoic acid, 3-(p-N,N-diphenylaminophenyl)-5-phenyl dithiolium perchlorate, etc., are known to convert to mercaptans in aqueous solution. Also acyclic disulfides of the type disclosed for use as antifoggants by Millikan and Herz U.S. Pat. No. 3,397,986, issued Aug. 20, 1968, can be employed. The mercaptans can be employed in the form of hydrolyzable metal salts, if desired.

Conventional silver halide antifoggants of various types which are free of mercapto groups can also be employed as catalyst poisons. These antifoggants are useful catalyst poisons within the conventional antifoggant concentrations generally above 1 gram per liter. Although antifoggants exhibit differing optimum concentrations, useful levels of catalyst poisoning can be obtained in the range of from about 1 gram per liter to 30 grams per liter, preferably from about 2 to 10 grams per liter where the antifoggant neither has nor is capable of forming a mercapto substituent.

Exemplary useful antifoggants include the following:

Oxazole, selenazole and thiazole antifoggants of the type disclosed by Brooker et al U.S. Pat. No. 2,131,038;

Imidazole antifoggants of the type disclosed by Weisseberger et al U.S. Pat. No. 2,324,123, Bean U.S. Pat. No. 2,384,593 and DeSelms U.S. Pat. No. 3,137,578;

Urazole antifoggants of the type disclosed by Carrol et al U.S. Pat. No. 2,708,162;

Tetraazaindene antifoggants of the type disclosed by Carroll et al U.S. Pat. No. 2,716,062, Piper U.S. Pat. No. 2,886,437 and Heimbach U.S. Pat. No. 2,444,605;

Isothiouronium salt antifoggants of the type disclosed by Herz et al U.S. Pat. No. 3,220,839;

Cyclic hydrazide antifoggants of the type disclosed by Anderson et al U.S. Pat. No. 3,287,135 and Milton U.S. Pat. No. 3,295,981;

Pyrazolidone antifoggants of the type disclosed by Milton U.S. Pat. No. 3,420,670;

Aminomethylthiocarboxylic acid antifoggants of the type disclosed by Cossar et al U.S. Pat. No. 3,547,638;

Tetrazole antifoggants of the type disclosed by Tuite et al U.S. Pat. No. 3,576,638;

Thiazoline-2-thione antifoggants of the type disclosed by Herz U.S. Pat. No. 3,598,598;

4-Pyrimidinethione antifoggants of the type disclosed by Lamon U.S. Pat. No. 3,615,621;

4-Thiouracil antifoggants of the type disclosed by Lamon U.S. Pat. No. 3,622,340;

Nitron;

Nitroimidazole antifoggants, such as 6-nitroimidazole, 5-nitro-1H-imidazole;

Triazole antifoggants, such as benzotriazole, 5-methyl-benzotriazole, 5,6-dichlorobenazotriazole, 4,5,6,7-tetrachloro-1H-benzotriazole;

Sulfocatechol antifoggants of the type disclosed by Kennard et al U.S. Pat. No. 3,236,652 and Similar known antifoggants.

The catalytic element must be ultrasonically exposed before poisoning of the imaging catalyst has been completed. The rate of poisoning of the imaging catalyst naturally depends upon the concentration of the catalyst poison in the transport liquid. Except where rapid poisoning of the imaging catalyst as a function of association with the transport liquid containing the catalyst poison prohibits, it is usually preferred to allow the catalytic element at least a few seconds, preferably at least about 5 seconds, of contact with the transport liquid before initiating ultrasonic exposure. The period of contact between the catalytic element and the transport liquid containing catalyst poison before ultrasonic exposure (referred to as the preexposure diffusion period) can be useful in reducing or eliminating any observed induction period—that is, any delay between the onset of ultrasonic exposure and detectable poisoning. For some catalytic elements poisoning of the imaging catalyst occurs too rapidly upon contact with the catalyst poison containing transport liquid, and there is no advantage to delaying the ultrasonic exposure.

The catalytic element, in association with the transport liquid containing the catalyst poison is imagewise exposed to ultrasonic radiation. This can be accomplished using any conventional sonic camera which is capable of impinging ultrasonic radiation on the element as an image receptor. In such a sonic camera a sonic source or transducer (i.e., an emitter of ultrasonic radiation) and the element are spatially related so that the ultrasonic radiation, unless interrupted, can impinge on the barrier material of the catalytic element to be imagewise exposed. Between the sonic transducer and the catalytic element is interposed any means which will imagewise modulate the ultrasonic radiation as it is received by the barrier material. In a simple form this can take the form of an apertured template which absorbs or reflects the ultrasonic radiation which strikes it and allows a portion of the ultrasonic radiation to pass through the aperture to the element. Alternatively the reflected ultrasonic radiation can be caused to impinge on the element. In a more sophisticated form the imaging means can include combinations of sonic lenses and reflectors for focusing and directing the ultrasonic radiation. In one application of this process an object whose ultrasonic modulation characteristic is desired to be recorded is placed in the sonic camera so that it intercepts ultrasonic radiation passing from the sonic transducer to the element. For example, the ultrasonoscope of Brenden U.S. Pat. No. 3,765,043 can be readily adapted for use as a sonic camera in the practice of this invention merely by locating the catalytic element in one of the water tanks so that it is impinged by the ultrasonic radiation which has passed through or been reflected by the object under examination.

In a simple mode of practicing this process, a single transport liquid is in contact with the sonic transducer and the catalytic element and provides a medium for transmission of ultrasound therebetween. In an alternative form the sonic transducer can be contacted with one transport liquid and a second transport liquid containing the catalyst poison can be in contact with the catalytic element with an ultrasonically transmitting partition, such as a membrane, separating the two transport media. In still another form the catalyst poison and a first transport liquid can be coated over the barrier material of the element to be imagewise exposed and a second transport liquid which is chemically compatible with the catalyst element can be placed in contact therewith to permit ultrasonic exposure. For example, a polar solvent containing the catalyst poison can be imbibed into or coated on a layer formed by the barrier material and then the catalytic element immersed in a nonpolar liquid, such as cyclohexane, benzene, etc.

The transport liquid containing the catalyst poison can be brought into contact with the catalytic element by any one of a variety of conventional techniques. For example, the catalytic element can be immersed in a reservoir containing the transport liquid and catalyst poison, if desired. Instead of immersing the catalytic element in the reservoir, the catalytic element can be sprayed, swabbed or otherwise bathed with the transport liquid containing the catalyst poison. The transport liquid containing the catalyst poison can be coated on the catalytic element by conventional techniques, such as release from a pod of the type employed in image transfer photography. Any of the techniques disclosed by Rosenfeld in Dutch patent application 7,801,872, published Aug. 22, 1978, for bringing a polar solvent into contact with a photographic element to be ultrasonically exposed can also be employed.

Some elements, such as those having film supports, directly absorb only a very small fraction of the total ultrasonic radiation to which they are exposed, the rest passing directly through the element. Accordingly, it is possible during ultrasonic exposure to orient a catalytic film element so that either the barrier layer surface or the film support of the element is nearest the sonic radiation source. Also, imaging catalyst and barrier material containing layers can be coated on both major surfaces of the film support and concurrently exposed.

Further, it is possible to stack two or more catalytic elements so that ultrasonic radiation passes through them sequentially during exposure. Of course, where precise focusing of the ultrasonic radiation is desired, the number of elements which will produce optimum images may be limited. By the way of contrast, photographic paper supports absorb almost all of the ultrasonic imaging radiation to which they are exposed according to this process. For elements having paper supports the barrier material containing layer must be on the side nearest to the source of the ultrasonic radiation source. Generally better image quality is obtained in all instances where the barrier material containing layer is on the face of the support nearest the ultrasonic energy source.

Inasmuch as the ultrasonic energy which is applied to the catalytic element during imagewise exposure is not required to form a viewable image, but merely required to alter the imaging catalyst so that a viewable image can be formed by subsequent processing techniques, the ultrasonic energy levels can be substantially below those employed in directly producing a viewable image with ultrasound. Although varied ultrasonic energy levels can be employed, it is preferred to employ ultrasonic exposures below 100 watt-sec/cm$^2$.

Just as different photographic elements exhibit marked differences in their sensitivity to electromagnetic exposure, different catalytic elements will also exhibit different sensitivities to ultrasonic radiation. By exposing catalytic elements to differing ultrasonic intensities and then performing the remaining processing steps, the optimum ultrasonic exposure for a given catalytic element can be readily determined. In a manner analogous to light sensitometry using a step tablet, it is possible to expose a catalytic element simultaneously in lateral areas with an array of laterally spaced sonic transducers which are calibrated to transmit ultrasonic radiation at predetermined stepped levels of intensity. Upon subsequent processing, densities produced by each transducer can be plotted against ultrasonic exposure. This generates an ultrasonic characteristic curve for the particular catalytic element from which the optimum intensity of ultrasonic exposure can be readily determined.

The determination can be repeated using differing durations of ultrasonic exposure, if desired, although this is not usually necessary. In using photographic cameras varied shutter speeds (exposure times) and f-stop settings (exposure intensities) are available to the photographer to achieve a given exposure, since exposure is recognized to be the mathematical product of exposure time and intensity. The proposition that equal photographic exposures differing in intensity and duration produce similar photochemical response is referred to as the photographic reciprocity law, and this law is generally relied upon in photography in varying exposure times and intensities, although it is recognized that many photographic elements exhibit significant reciprocity law failure. By analogy to photography, various combinations of ultrasonographic exposure times and intensities which produce similar exposures as a mathematical product can be relied upon in a general way in accordance with a reciprocity law of ultrasonic exposure which is analogous to the photographic reciprocity law.

Any ultrasonic frequency heretofore employed in ultrasonography can be applied to the practice of this process. For a given transport liquid the wavelength of the ultrasonic radiation is reciprocally related to its frequency. Since best imaging results in ultrasonography and ultrasonoscopy are recognized to be obtainable when the wavelength of the ultrasonic imaging radiation is substantially shorter than the dimension of the object or object feature to be imaged, it is generally preferred to operate at shorter wavelength and hence higher frequencies. For example, at a frequency of 1 megahertz ultrasonic radiation transmitted in water exhibits a wavelength in the order of 1.5 millimeters. Accordingly in obtaining ultrasonographs of objects or object features of about 1.5 millimeters in dimension it is preferred to operate substantially above 1 megahertz, typically in the range of 2.5 to 100 megahertz. Frequencies in the order to gigahertz are known in the art and can be employed, particularly when microscopic image definition is required. The high operating frequencies are, of course, advantageous since they effectively define both large and small objects and object features, although increased absorptivity of many materials at higher frequencies requires thinner object samples.

The ultrasonic exposure of the catalytic element can be constant in intensity for the duration of exposure or it can be varied in intensity. Pulsing of the ultrasonic exposure can be achieved by continuously modulating the intensity of exposure or, preferably, interrupting ultrasonic exposure so that ultrasonic exposure is divided into separate bursts or discrete pulses. It is contemplated to employ discrete pulses wherein the duration of the pulses and the interval therebetween is less than a tenth of a second. The duration of the ultrasonic pulse and the interval between pulses can be varied independently, if desired. The minimum useful pulse and interval durations are limited only by the capabilities of the ultrasonic emitters selected for use. Naturally, as the pulses and intervals between pulses approach the frequency of the ultrasonic radiation, continuous exposure will be approached as a limit.

Following ultrasound exposure the catalytic element is removed from contact with the reservoir of catalyst poison provided by the transport liquid. This can be done immediately after the termination of ultrasonic exposure or after some delay. In using lower ultrasonic exposure energy levels (less than 100 watt-seconds per square centimeter) and slower rates of catalyst poisoning in the absence of ultrasound it has been observed that enhancements in ultrasonic imaging can be achieved by allowing the catalytic element to remain undisturbed in contact with the catalyst poison containing transport liquid following the completion of ultrasonic exposure. It is believed that the period of contact following ultrasound exposure (referred to as the post-exposure diffusion period) permits catalyst poison diffusion through the barrier material initiated by ultrasound exposure to continue. Although the optimum duration of the post exposure diffusion periods can vary widely, enhancement in density differences between ultrasonically exposed and background areas for optimally balanced systems occur when the catalyst element remains undisturbed for a period of from 10 to 200 seconds (optimally from about 15 to 50 seconds) following ultrasonic exposure at ordinary room temperatures (20° to 25° C.).

The catalytic elements containing an image pattern of poisoned and unpoisoned catalyst can be processed to produce a visible positive image pattern corresponding to the image pattern of ultrasonic exposure. Physical development of catalyst-containing elements to produce metal images is well known in the art. For example, the elements can be processed in the presence of image-forming material, such as a salt or complex of a heavy metal ion (e.g., silver, copper, palladium, tellurium, cobalt, iron and nickel) which reacts with a reducing agent, such as a silver halide developing agent, at the catalyst surface. Either the absorption or solubility of the image-forming material can be altered by physical development. The image-forming material and/or reducing agent can be incorporated in the photographic element, in a separate element associated during processing or, most commonly, in an aqueous processing solution. The processing solution can contain addenda to adjust and buffer pH, ionic surfactants and stabilizers, thickening agents, preservatives, silver halide solvents and other conventional developer addenda.

Such physical development systems are illustrated by Archambault et al U.S. Pat. No. 3,576,631, Silverman U.S. Pat. No. 3,591,609, Yudelson et al U.S. Pat. Nos. 3,650,748, 3,719,490 and 3,598,587, Case U.S. Pat. No. 3,512,972, Charles et al U.S. Pat. No. 3,253,923, Wyman U.S. Pat. No. 3,893,857, Lelental *Research Disclosure,* Vol. 156, Apr. 1977, Item 15631 and U.S. Pat. No. 3,935,013 and Weyde et al U.K. Pat. No. 1,125,646, each particularly illustrating heavy metal salts and complexes; Cole U.S. Pat. No. 3,390,998 and Jonker et al U.S. Pat. No. 3,223,525, particularly illustrating processing solutions containing ionic surfactants and stabilizers and Bloom U.S. Pat. No. 3,578,449, particularly illustrating processing solutions containing silver halide solvents. Physical developers which produce dye images can be employed, as illustrated by Gysling et al U.S. Pat. Nos. 4,042,392 and 4,046,569. Physical development systems are also disclosed in O'Brien U.S. Pat. No. 4,084,967.

The above physical developers are used as aqueous solutions but the imagewise distribution of catalytic nuclei obtained by the process of this invention can also be incorporated in a dry imaging element. Dry silver amplification chemistry is well known in the photographic art as described in U.S. Pat. Nos. 3,761,279, 3,700,457, 3,785,830, British Patent Nos. 1,342,523 and 1,342,522 and dry process based on the catalyzed thermal deposition of tellurium have recently been reported in Research Disclosure, Vol. 166, February 1978, Item 16656 and Vol. 169, May 1978, Item 16926.

In a preferred approach to forming a dye image, after forming an imagewise distribution of unpoisoned catalyst, the catalytic element is transferred to a peroxide oxidizing agent containing aqueous redox amplification bath of the type disclosed in Matejec U.S. Pat. No. 3,674,490 or Matejec et al U.S. Pat. No. 3,776,730. The bath can also take the form of that disclosed in British Patent 1,329,444, "Image Amplification Systems," Item 11660 of *Research Disclosure,* Vol. 166, December 1973, or Bissonette U.S. Pat. No. 4,089,685. The disclosures of each of the above are herein incorporated by reference.

The peroxide oxidizing agents employed in the practice of this invention can be chosen from among conventional peroxide oxidizing agents which are known to require the presence of a catalyst surface to oxidize a dye-image-generating reducing agent. Peroxide oxidizing agents of this type include water-soluble compounds containing a peroxy group, such as inorganic peroxide compounds or salts of peracids. For example, perborates, percarbonates or persilicates and, particularly, hydrogen peroxide, can be employed as peroxide oxidizing agents in the practice of this invention as well as organic peroxide compounds such as benzoyl peroxide, percarbamide and addition compounds of hydrogen peroxide and aliphatic acid amides, polyalcohols, amines, acyl-substituted hydrazines, etc. It is preferred to employ hydrogen peroxide, since it is highly active and easily handled in the form of aqueous solutions. Peroxide oxidizing agent concentrations of from 0.001 mole to 0.5 mole per liter of amplification bath are preferred.

Except where an immobile dye-image-generating reducing agent, such as an RDR, is incorporated in the catalytic element, the redox amplification bath contains a mobile dye-image-generating reducing agent. This dye-image-generating reducing agent can be of any conventional type heretofore employed in redox amplification baths. In one form, the dye-image-generating reducing agent is a compound which forms a highly colored reaction product upon oxidation or which upon oxidation is capable of reacting with another compound, such as a color coupler, to form a highly colored reaction product. Where the dye-image-generating reducing agent forms a colored reaction product directly upon oxidation, it can take the form of a dye precursor such as, for example, a leuco dye or vat dye that becomes highly colored upon oxidation.

Where the dye-image-generating reducing agent is oxidized to form a highly colored reaction product with another compound, such as a color coupler, the dye-image-generating reducing agent is preferably employed in the form of a color developing agent. The coupler to be employed in combination with the color developing agent can be present in the redox amplification bath in the same concentrations normally employed in color developer compositions. In a preferred form, however, the coupler is incorporated in the catalytic element to be processed.

Instead of producing a colored reaction product upon oxidation, the dye-image-generating reducing agent can be of a type which is initially colored, but which can be used to provide an imagewise distribution of image dye by alteration of its mobility upon oxidation. Dye-image-generating reducing agents of this type include dye developers of the type disclosed, for example, in Rogers U.S. Pat. Nos. 2,774,688 and 2,983,606, here incorporated by reference. These compounds are silver halide developing agents which incorporate a dye moiety. Upon oxidation by the peroxide oxidizing agent directly or acting through a cross-oxidizing auxiliary silver halide developing agent (such as described below), the dye developer alters its mobility to allow a dye image to be produced. Typically, the dye developer goes from an initially mobile to an immobile form upon oxidation in the redox amplification bath.

The amount of mobile dye-image-generating reducing agent incorporated within the amplification bath can be varied over a wide range corresponding to concentrations in conventional photographic developer baths. The amount of color developing agent used in the amplification bath is preferably from about 1 to 20 and, most preferably, from about 2 to 10 grams per liter, although both higher and lower concentrations can be employed.

Where the catalytic element initially contains one or more RDR's acting as dye-image-generating agents, the redox amplification bath contains a cross-oxidizing developing agent (also referred to in this type of application as an electron transfer agent). Any of the black-and-white developing agents used with color developing agents, as described above to perform cross-oxidation, can be employed. Exemplary useful cross-oxidizing developing agents are also described in the patents referred to above disclosing RDR's and their use. Illustrative examples of preferred developing agents useful as cross-oxidizing developing agents (or electron transfer agents) in practicing this invention include 1-phenyl-3-pyrazolidone, 1-phenyl-4,4-dimethyl-3-pyrazolidone and 4-hydroxymethyl-4-methyl-1-phenyl-3-pyrazolidone.

Redox dye-releasers are similar to color developing agents employed in combination with cross-oxidizing developing agents in that redox dye-releasers react through an intermediate redox couple provided by a cross-oxidizing silver halide developing agent. In this redox couple the silver halide developing agent reacts with the peroxide oxidizing agent on a catalytic surface to form oxidized developing agent. The oxidized developing agent then reacts with the redox dye-releaser and is regenerated. The oxidized redox dye-releaser hydrolyzes in an aqueous alkaline medium provided by the amplification bath to release mobile dye.

Since the dye-image-generating reducing agents employed in the practice of this process have heretofore been employed in the art in silver halide photographic elements and developer solutions, best results can be obtained by maintaining the amplification bath within the alkaline pH ranges heretofore employed in developing photographic silver halide emulsions to form dye images using these dye-image-generating reducing agents. Preferred alkalinity for the amplification bath is at least 8, most preferably from 10 to about 14. The amplification bath is typically maintained alkaline using activators of the type employed in developers for silver halide photographic elements for this purpose.

Other addenda known to facilitate image-dye formation in alkaline photographic developer solutions with specific dye-image-generating reducing agents can also be included in the amplification bath. For example, where incorporated color couplers are employed, it may be desirable to incorporate an aromatic solvent such as benzyl alcohol to facilitate coupling. Where lower pH alkaline amplification baths are being employed in combination with RDR-containing catalytic elements, the mobility of the released dye can be enhanced by incorporating amino acids or combinations of amines and aliphatic carboxylic acids. Exemplary useful compounds include $\omega$-amino acids, such as 2-aminoacetic acid, 4-aminobutyric acid, 6-aminohexanoic acid, 11-aminoundecanoic acid and 12-aminododecanoic acid. Such released dye solubilizers can be present in the amplification bath in concentrations of from about 0.1 to 60 grams per liter, preferably from about 1 to 20 grams per liter.

The foregoing discussion of imaging techniques is intended to be illustrative of preferred conventional imaging techniques which can be employed. For example, instead of forming either metal or dye images, vesicular images can be formed. The use of $Pd^\circ$ and $Ag^\circ$ to catalyze the decomposition of hydrogen peroxide and produce vesicular images is disclosed, for instance, in U.S. Pat. Nos. 3,765,890, 3,761,265 and 3,674,490.

In the foregoing processes extended contact of the catalytic element with the transport liquid containing the catalyst poison in the absence of ultrasound will result in the uniform poisoning to some degree of the imaging catalyst. Where the catalytic element is intended to form a positive image—that is, to produce a maximum density in areas not exposed to ultrasound, a preferred system will permit a density of at least 0.5 to be produced in the catalytic element when the time of contact of the transport liquid and the catalytic element is within the time range of from 10 seconds to 10 hours and no ultrasound exposure is undertaken. If the maximum density is rapidly decreasing and less than 0.5 with a contact period of 10 seconds in the absence of ultrasound, then reproducible imaging will be difficult without obtaining low maximum densities or without employing high speed transport techniques for bringing the catalytic element into and out of contact with the transport liquid. On the other hand, if a readily visually detectible reduction in maximum density (at least 0.1, preferably at least 0.3) is not achieved within a 10 hour period of association, the process will be unattractively slow when ultrasound is employed at lower power levels, such as are preferred in the practice of this process.

The preferred response criteria of the imaging system can be satisfied by routine procedures, such as adjustment of the catalyst concentration, the proportion of barrier material when blended or the thickness of the barrier layer when overcoated, the degree of hardening of the barrier material and/or the concentration of the catalyst poison. It is preferred to employ the catalyst in the same concentrations as in conventional elements used in physical development and redox amplification imaging. The barrier materials can be used in the same proportions as in silver halide emulsions and photographic elements. The barrier material can be coated at a coverage of from 0.2 to 20 grams per square meter, preferably from 0.1 to 5 grams per square meter. Generally the rate of poisoning of the catalytic element in the absence of ultrasound can be most conventionally adjusted merely by regulating the concentration of the catalyst poison in the transport liquid. Addition of a barrier layer or alteration of the barrier layer thickness is also a convenient approach for adjustment of the system.

When the imaging catalyst is present in an electrically conducting form or is coated on a conductive support or layer to provide a catalytic surface and the transport liquid containing the catalyst poison is ionically conductive, it is possible to forestall poisoning of the image catalyst prior to and/or following ultrasound exposure. This can be accomplished merely by biasing the catalyst to a positive potential which exceeds its oxidation potential—that is, by bringing a counter electrode into contact with the transport liquid while it is in contact with the catalytic element and establishing a potential difference between the catalytic element and the counter electrode. The catalytic element functions as a positive electrode, the counter electrode as a negative electrode and the transport liquid containing the catalyst poison functions as an electrolyte.

It might be thought that positively biasing the catalytic element would attract the catalyst poison to the catalytic element and to accelerate the rate of poisoning, since the preferred catalyst poisons, such as halide ions and mercapto poisons, are present as anionic species. In fact, the opposite is the case. The effect of positively biasing the catalytic element is to maintain the catalyst surface substantially unpoisoned. It is believed that this results from a portion of the catalyst surface being converted from a metallic form to a cationic form which is free to migrate into the overlying barrier material. The cations liberated by the catalyst surface react with the catalyst poison anions migrating to the catalyst surface, thereby intercepting and inactivating the catalyst poison.

Efficient protection of the catalytic elements can be achieved at relatively low potentials of less than about +5 volts. It is generally preferred to bias the catalytic element above the oxidation potential of the imaging catalyst but below the potential which causes breakdown of the transport liquid at the catalyst surface. In the case of aqueous solutions of the catalyst poison, the catalytic elements are preferably biased to a potential less than the potential which causes the formation of substantial amounts of gaseous products between or within the barrier material and the conductive catalyst.

The advantage of being able to eliminate catalyst poisoning prior to and/or following ultrasound exposure by electrical biasing is that similar imaging results can be achieved with identical ultrasonic exposures even through the period of contact between the catalytic element and the transport liquid containing the catalyst poison before and/or after ultrasonic exposure is uncontrolled or varied. In the absence of electrical biasing care must be taken ordinarily to control the entire period of contact between the catalytic element and catalyst poison containing transport liquid in order to obtain replicable imaging. By reducing the period which must be precisely controlled to just the period of ultrasonic exposure or the period of ultrasonic exposure as well as, optionally, pre-exposure and post-exposure diffusion, discussed above, the process is more easily controlled. Further, electrical biasing permits use of systems which otherwise exhibit higher rates of spontaneous catalyst poisoning in the absence of ultrasound, since the period of ultrasonic exposure (and, optionally, the periods of pre-exposure and/or post-exposure diffusion) can be short as compared to the total time of contact between the catalyst poison containing transport liquid and the catalytic element. Applying the potential bias after ultrasound exposure advantageously does not significantly reactivate the imagewise poisoned catalyst.

The foregoing discussion is considered sufficiently complete to permit those familiar with the photographic and ultrasonic arts to practice this process. To the extent that specific details and variants of this process and means for its practice are not explicitly discussed they can be appreciated by reference to the photographic and ultrasonic arts. For example, it is contemplated that the ultrasonic exposure, development and other processing steps of this process can be practiced within the temperature ranges conventionally employed in photography.

The invention is further illustrated by the following examples:

EXAMPLES 1 AND 2

Catalytic elements were employed consisting of a polyester film support and, coated thereon, a composition comprised of a cyan dyeforming coupler (1076 mg/m$^2$), yellow colloidal silver (10 mg/m$^2$) and gelatin (1560 mg/m$^2$). The yellow colloidal silver functioned as a catalyst and the gelatin as a barrier material. The coupler was incorporated to assist in forming a dye image.

A catalyst poison bath was prepared consisting of a 1:1 (volume ratio) methanol-distilled water solution as a transport liquid and $6 \times 10^{-5}$ mol/l potassium iodide as a catalyst poison. A redox image amplification processing bath was prepared of the composition set forth in Table I, and 10 ml of 30 volume percent hydrogen peroxide aqueous solution were added to the processing bath just prior to use.

TABLE I

| Redox Processing Bath | |
|---|---|
| 4-amino-3-methyl-N-ethyl-N-$\beta$-(methanesulfonamido)ethyl-aniline sulfate hydrate | 5 g |
| $Na_2SO_3$ | 4 g |
| $Na_2CO_3$ | 20 g |
| Benzyl alcohol | 10 ml |
| KBr | 0.002 g |
| Distilled water to 1 liter | |

When the elements were processed without prior contact with the poisoning bath, a maximum cyan dye density of 3.2 was obtained. By bringing elements into prior contact with the poisoning bath for varied times, it was determined that the dye density decreased substantially linearly to 1.0 after 50 seconds of immersion in the catalyst poison bath. In each instance the elements were washed in distilled water for 1 minute after removal from the catalyst poison bath, placed in the redox processing bath for 2 minutes and then rinsed in a 1 percent acetic acid solution (a conventional photographic stop bath intended to stop generation of dye and remove unused color developer).

To ascertain ultrasonic imaging response several elements were placed in the catalyst poison bath for a period of 20 seconds and then given an ultrasonic exposure. The remaining processing was as indicated as above. The results are shown as Curve 1 in FIG. 1 in which the cyan dye density is plotted against ultrasound exposure in milliwatt-seconds per square centimeter. The ultrasound exposure is plotted on a log scale.

When the period of contact between the elements and the catalyst poison bath prior to ultrasound exposure was reduced to 5 seconds, the results were as indicated by Curve 2 in FIG. 1. A higher maximum density was obtained when the element was in contact with the catalyst poison bath for 5 seconds rather than 20 seconds prior to ultrasound exposure.

EXAMPLE 3

Catalytic elements were employed consisting of a polyester film support and, coated thereon, a composition comprised of yellow colloidal silver (9.5 mg/m$^2$) and gelatine (1560 mg/m$^2$). A $6\times10^{-5}$ molar solution of 1-phenyl-5-mercaptotetrazole in distilled water was prepared for use as a catalyst poison bath. A conventional silver physical development bath containing silver nitrate was employed for processing of the composition set forth by H. Jonker et al, *Photographic Science and Engineering*, Vol. 13, page 38 (1969). An element processed for 30 seconds in the physical developer without prior contact with the catalyst poison bath and without ultrasound exposure exhibited a density of greater than 4.00 to red light. This was a blue appearing silver image, not a dye image, the blue appearance probably being a result of silver particle size and configuration. When elements were immersed in the catalyst poison bath for various times up to about 75 seconds and then washed for 15 seconds with distilled water prior to processing the density decreased substantially linearly to a density of 1.00 to red light when immersed in the catalyst poison bath for 75 seconds. In each case the elements were washed with distilled water for 30 seconds following processing.

When the elements were processed as described above, but were immersed in the catalyst poison bath for 5 seconds prior to ultrasonic exposure, ultrasonically exposed for 10 seconds at varied intensity levels and then allowed to remain in the catalyst poison bath for 30 seconds following ultrasonic exposure, results at various ultrasonic (U.S.) exposure levels were obtained as set forth below in Table II.

TABLE II

| U.S. Exposure (Watt-sec/cm$^2$) | Density To Red Light | Density to White Light |
|---|---|---|
| 0 | 3.5 | 1.80 |
| 5 | 3.2 | 1.70 |
| 6 | 0.02 | 0.10 |
| 18 | 0.02 | 0.10 |
| 50 | 0.02 | 0.10 |

EXAMPLE 4

A procedure similar to that of Example 3 was followed, except that the elements were exposed for 10 seconds to pulsed ultrasonic energy (pulse width 10$^{-6}$ second, pulse period 10$^{-4}$ second, number of pulses 10$^5$) at various intensity levels, the elements were allowed to remain in the catalyst poison bath for 35 seconds following ulrasonic exposure and the elements were immersed in the physical developer for 60 seconds instead of 30 seconds. The results are set forth below in Tabel III.

TABLE III

| U.S. Exposure (Watt sec/cm$^2$) | Density to Red Light | Density to White Light |
|---|---|---|
| 0 | >4.0 | 2.9 |
| 0.6 | 4.0 | 2.7 |
| 1.8 | 0.02 | 0.1 |
| 5 | 0.02 | 0.1 |

EXAMPLE 5

Catalytic elements were employed consisting of a polyester film support having vacuum vapor deposited thereon a silver layer (430.4 mg/m$^2$) overcoated with a composition comprised of gelatin (941.5 mg/m$^2$) and a cyan dye-forming coupler (538 mg/m$^2$).

One portion of one of the elements (Part A) was immersed for 120 seconds in a $1\times10^3$ molar solution of potassium iodide dissolved in distilled water, which functioned as a catalyst poison bath. Thereafter potential bias of +3 volts was placed on the element by connecting a dry cell battery between the element and a gold plated electrode also immersed in the catalyst poison bath. The element was then further immersed in the catalyst poison bath so that Part A remained immersed and a second portion (Part B) was also immersed. At the end of 120 seconds the element was removed from the catalyst poison bath, rinsed for 15 seconds with distilled water and placed for one minute in redox processing bath of the composition set forth below in Table IV to which 10 ml of 30 volume percent of hydrogen peroxide aqueous solution were added just prior to use.

TABLE IV

| Redox Processing Bath | |
|---|---|
| 4-amino-N-ethyl-N-(2-methoxy-ethyl)-m-toluidine di-p- | |

TABLE IV-continued

| | Redox Processing Bath |
|---|---|
| toluene sulfonate | 5 g |
| $K_2CO_3$ | 10 g |
| $K_2SO_3$ | 2 g |
| Distilled water to 1 liter | |

Upon removal from the bath the element was bathed for 10 minutes in a bleach-fix solution of the type described in U.S. Pat. No. 3,582,322.

Part B exhibited a cyan dye density of 2.07. When a separate element was similarly processed, but not immersed in the catalyst poison bath, a cyan dye density substantially identical to that of Part B was obtained. Separate elements identical to that described above when immersed in the catalyst poison bath for 120 seconds with no potential bias being applied and processed as described above exhibited a cyan dye density of 0.10 using the catalyst poison bath described above and a cyan dye density of 0.20 using a catalyst poison bath of lower catalyst poison concentration ($5 \times 10^{-4}$ mole of potassium iodide per liter) for 15 seconds. These results indicated that the electrical bias of the catalytic element had effectively prevented poisoning of Part B while immersed in the catalyst poison bath.

Part A of the element exhibited a cyan dye density of 0.27. It should be noted that Part A was not only immersed in the catalyst poison bath for 120 seconds without an applied potential, but was thereafter in contact with the catalyst poison bath for 120 seconds with the biasing potential applied. This result indicated that the biasing of Part A following its initial poisoning in the catalyst poisoning bath in the absence of a biasing potential did not have a significant reactivating effect on the poisoned catalyst.

When the procedure described above with respect to Part B was repeated, but the electrical bias of the element was discontinued to allow ultrasonic exposure, a positive dye image was obtained.

The invention has been described with particular reference to preferred embodiments thereof but it will be understood that variations and modifications can be effected within the spirit and scope of the invention.

What is claimed is:

1. A process of producing an ultrasonographic image comprising
    bringing into contact a transport liquid containing a catalyst poison and an element comprising a support coated with an imaging catalyst and barrier means, the barrier means being interposed between the catalyst poison containing transport liquid and the imaging catalyst to impede diffusion of the catalyst poison,
    exposing the element to ultrasound in an image pattern to accelerate diffusion of the catalyst poison through the barrier means in exposed areas of the element and
    catalyzing an image-forming reaction by the imaging catalyst which remains unpoisoned, so that an image pattern is produced which corresponds to the pattern of ultrasonic exposure.

2. A process of producing an ultrasonographic image comprising
    bringing into contact a transport liquid containing a silver halide stabilizer as a catalyst poison and an element comprising a support coated with a silver catalyst and a hydrophilic colloid, the latter interposed between the transport liquid and the silver catalyst,
    exposing the element to ultrasound in an image pattern to accelerate diffusion of the silver halide stabilizer through the hydrophilic colloid to the silver catalyst and
    physically developing the element to produce an image pattern which corresponds to the image pattern of ultrasonic exposure.

3. A process of producing an ultrasonographic image comprising
    bringing into contact an aqueous iodide solution and an element comprising a support coated with a silver catalyst and a hydrophilic colloid, the latter being interposed between the iodide solution and the silver catalyst,
    exposing the element to ultrasound in an image pattern to accelerate diffusion of the iodide through the hydrophilic colloid to the silver catalyst and
    physically developing the element to produce an image pattern which corresponds to the image pattern of ultrasonic exposure.

4. A process of producing an ultrasonographic image comprising
    bringing into contact a transport liquid containing a catalyst poison and an element comprising a support coated with a silver catalyst and a hydrophilic colloid, the latter being interposed between the silver catalyst and the catalyst poison,
    exposing the element to ultrasound in an image pattern to accelerate diffusion of the catalyst poison through the hydrophilic colloid to the silver catalyst and
    selectively reacting a dye-image-generating reducing agent and an oxidizing agent at the surface of the silver catalyst which remains unpoisoned, the oxidizing agent and the dye-image-generating reducing agent being chosen to be substantially less reactive in the absence of an unpoisoned catalyst surface, so that an image pattern is produced which corresponds to the image pattern of ultrasonic exposure.

5. A process of producing an ultrasonographic image comprising
    bringing a solution containing a transport liquid and a catalyst poison into contact with an element comprising a conductive portion presenting a catalyst surface and a barrier layer overlying the catalyst surface for impeding diffusion of the catalyst poison,
    electrically biasing the conductive portion to a positive potential in excess of the oxidation potential of the catalyst to inhibit poisoning of the catalyst surface,
    removing the electrical bias and exposing the element to ultrasound in an image pattern to accelerate diffusion of the catalyst poison through the barrier layer to the catalyst surface in ultrasound exposed areas and
    catalyzing an image-forming reaction at the catalyst surface in areas which remain unpoisoned, so that an image pattern is produced which corresponds to the pattern of ultrasonic exposure.

6. A process according to claim 1, 2, 3, 4 or 5 in which the element is exposed to pulsed ultrasonic radiation.

7. A process according to claim 1, 2, 3, 4 or 5 in which ultrasound energy of less than 100 watt-seconds per square centimeter is applied to the element during ultrasound exposure.

8. A process according to claim 1, 2, 3, 4 or 5 in which ultrasound exposure is delayed after contact of the catalytic element with the catalyst poison containing transport liquid to permit pre-exposure diffusion of the catalyst poison to occur.

9. A process according to claim 1, 2, 3, 4 or 5 in which the catalytic element is allowed to remain in contact with the catalyst poison containing transport liquid following ultrasound exposure to permit post-exposure diffusion of the catalyst poison to occur.

10. A process according to claim 1, 2, 3 or 4 in which the catalyst is formed by reducing silver halide to produce silver.

11. A process according to claim 1 in which the catalyst is chosen from the group consisting of group IB and VIII metals, their sulfides and selenides.

12. A process according to claim 1, 4 or 5 in which the catalyst poison containing transport liquid is an aqueous iodide solution.

13. A process according to claim 1, 2, 3 or 5 in which the image pattern is formed by a metal.

14. A process according to claim 1, 4 or 5 in which the image pattern is formed by a dye.

15. A process according to claim 14 in which the dye image is formed by reacting a dye-forming coupler with a color developing agent dye-image-generating reducing agent.

* * * * *